Aug. 12, 1941.  W. T. ENGEL  2,252,561
WIRE FEEDER
Filed Sept. 19, 1940  4 Sheets-Sheet 1
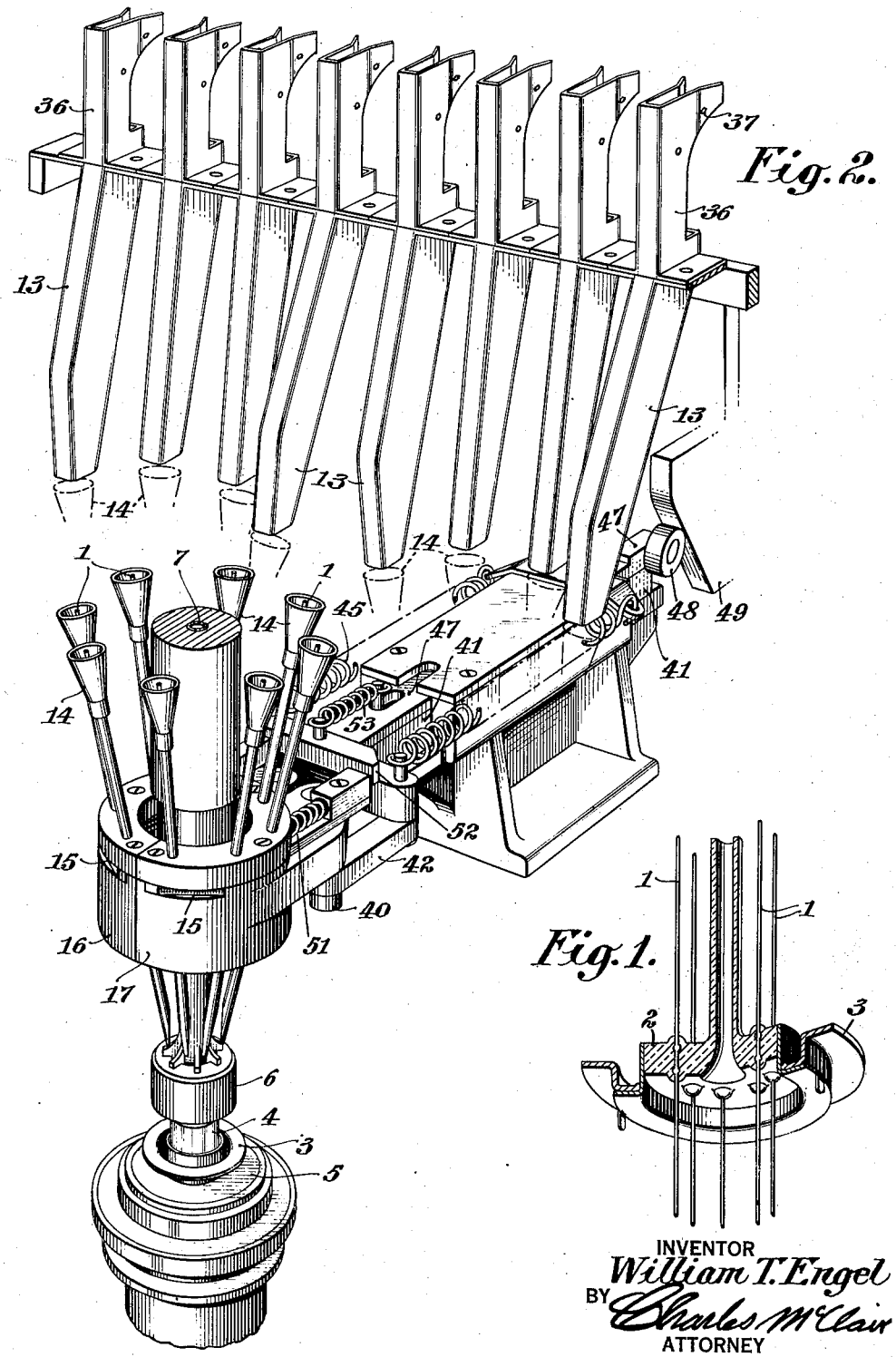
INVENTOR
William T. Engel
BY Charles McClair
ATTORNEY Aug. 12, 1941.   W. T. ENGEL   2,252,561
WIRE FEEDER
Filed Sept. 19, 1940   4 Sheets-Sheet 2
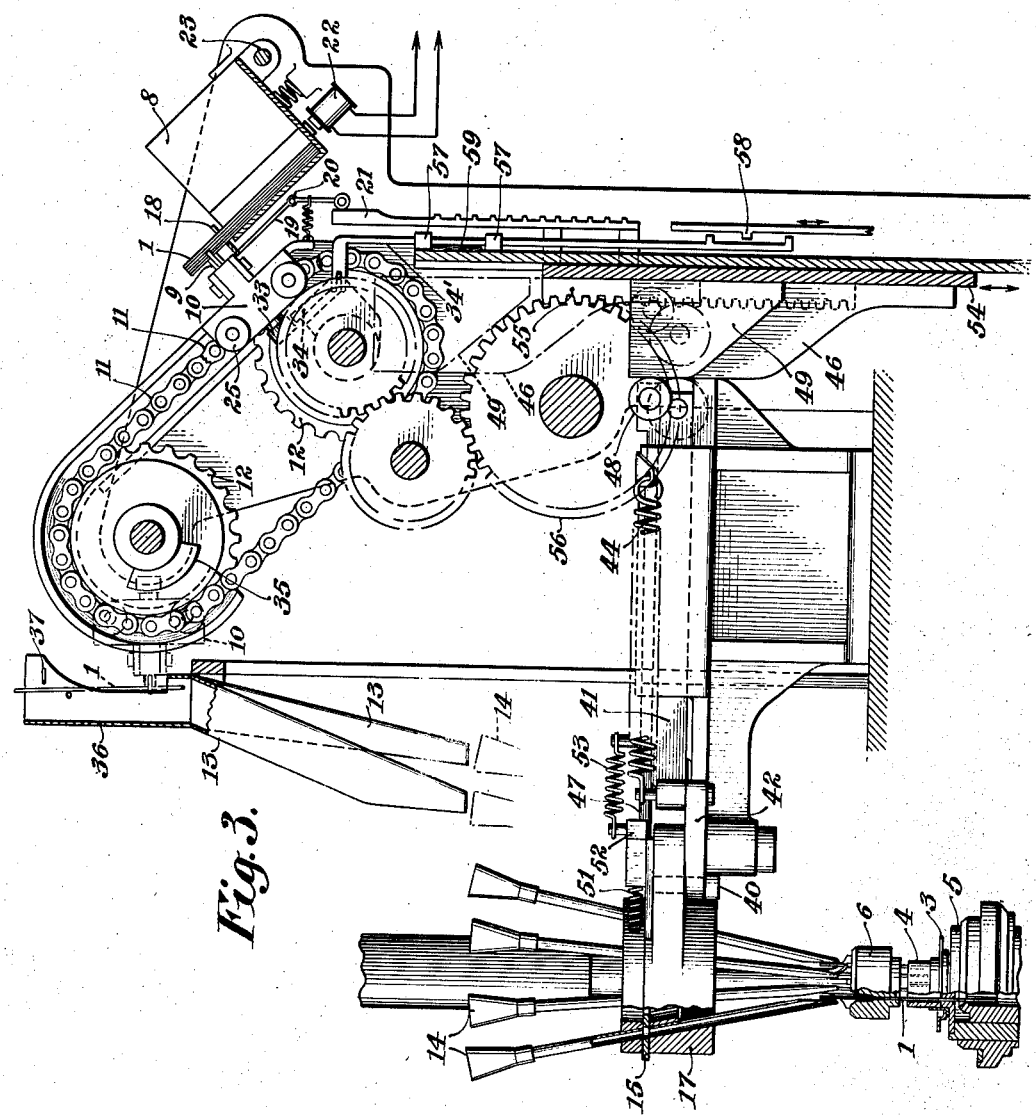
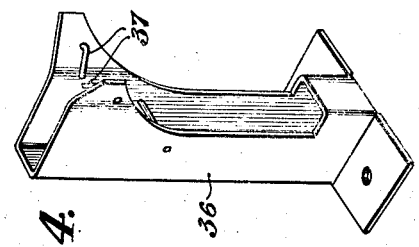
INVENTOR
William T. Engel
BY Charles McClair
ATTORNEY Aug. 12, 1941.  W. T. ENGEL  2,252,561
WIRE FEEDER
Filed Sept. 19, 1940  4 Sheets-Sheet 3
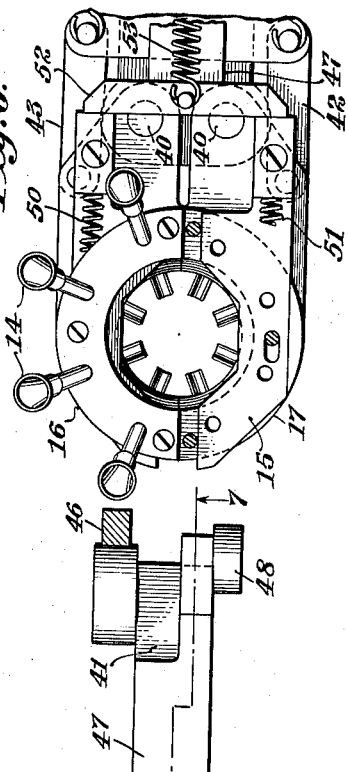
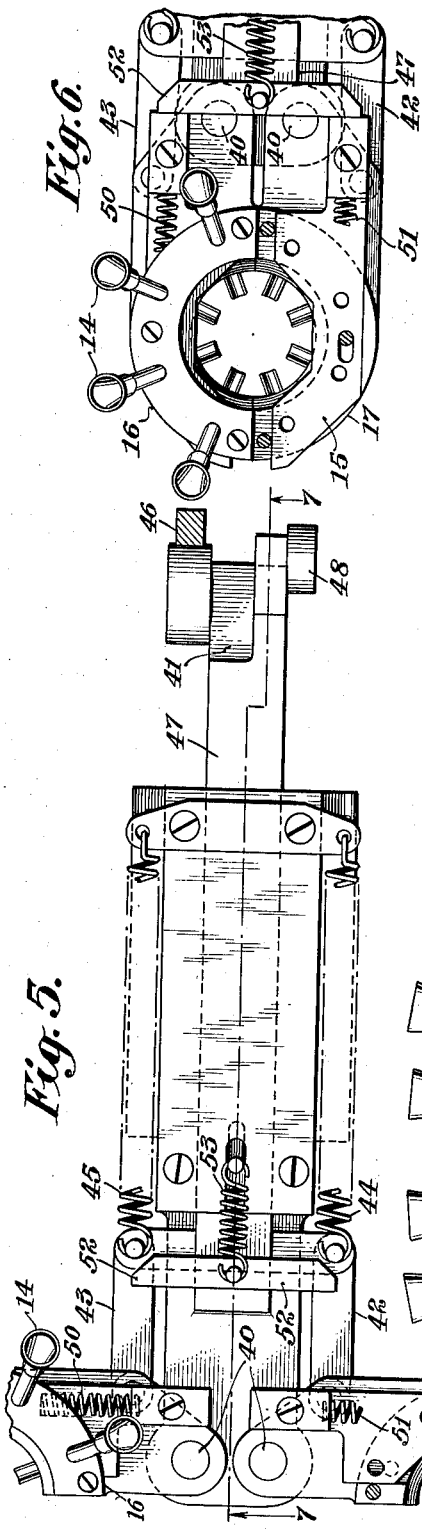
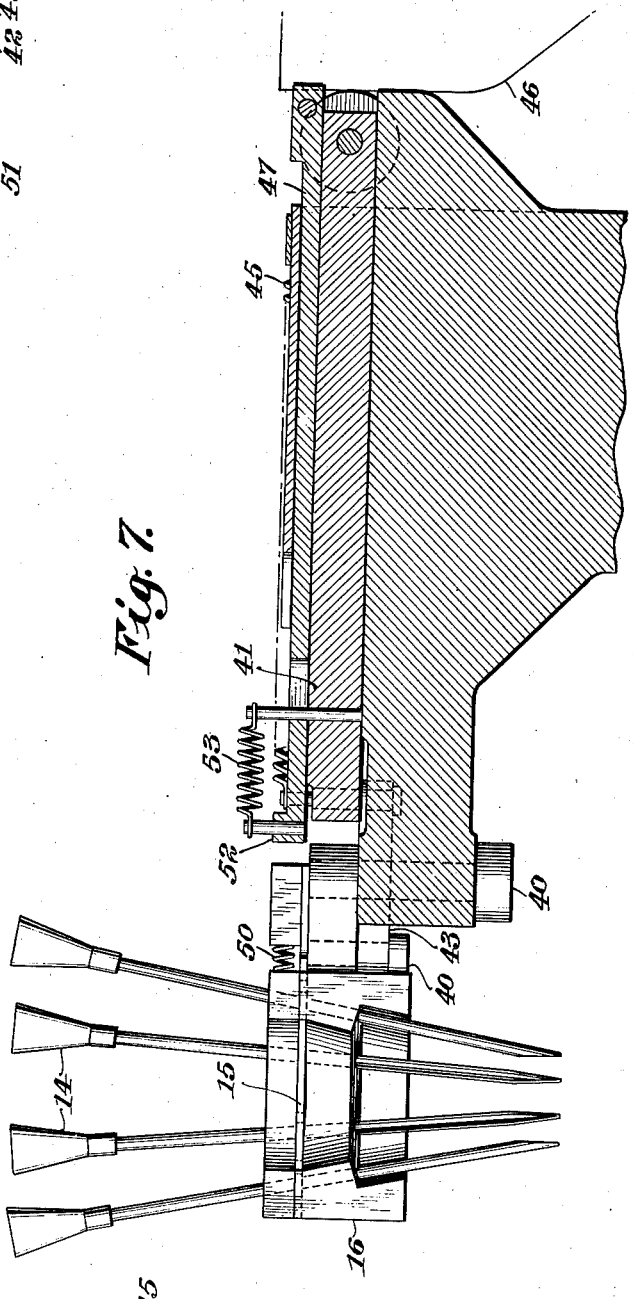
INVENTOR
William T. Engel
BY Charles McClair
ATTORNEY Aug. 12, 1941.   W. T. ENGEL   2,252,561
WIRE FEEDER
Filed Sept. 19, 1940   4 Sheets-Sheet 4
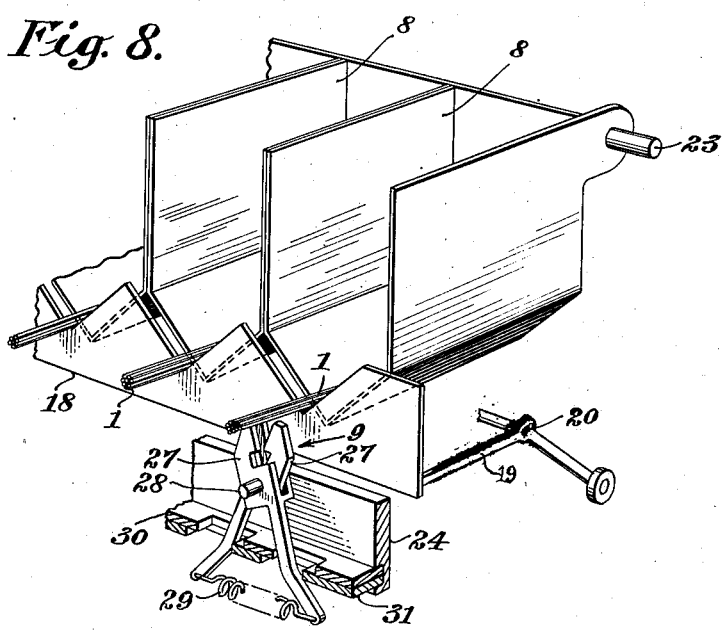
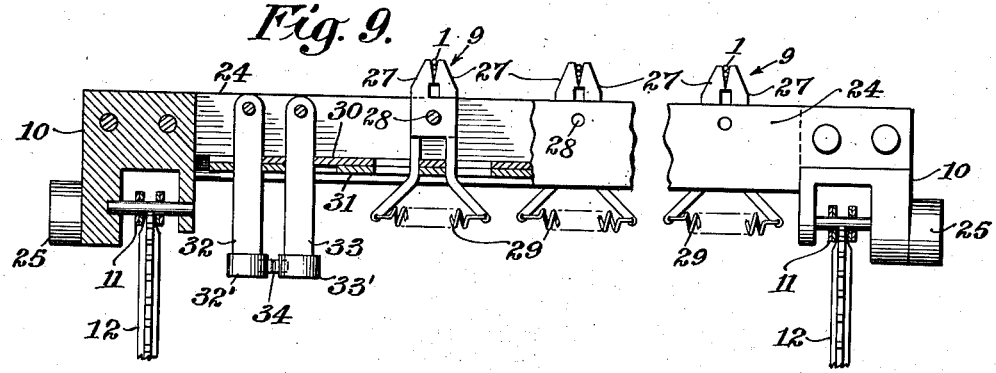
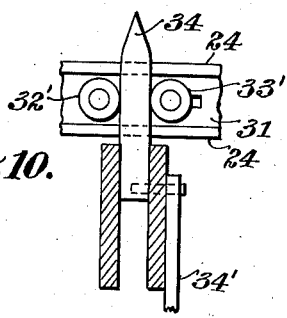
INVENTOR
William T. Engel
BY Charles McClair
ATTORNEY Patented Aug. 12, 1941

2,252,561

UNITED STATES PATENT OFFICE 2,252,561

WIRE FEEDER

William T. Engel, Irvington, N. J., assignor to Radio Corporation of America, a corporation of Delaware Application September 19, 1940, Serial No. 357,353

12 Claims. (Cl. 140—132)

My invention relates to wire feeding apparatus, particularly to apparatus for separating short lengths of wires from packs or bundles of the wires and depositing each wire in a predetermined place and position, such as apparatus for feeding lead wires to a header making machine commonly used in the manufacture of electron discharge devices.

The lead-in conductors or wires in envelopes of electron discharge devices are usually hermetically sealed in a header or stem for the envelope, and then the header or stem, with electrodes attached, is joined to the envelope. The speed with which the headers can be made is often limited by the rate the several wires may be placed in position in the header making machine, and where the wires are circularly arranged as in the so-called button stem header, described in United States patent to Franke 2,195,483, wire feeding is particularly difficult. The molds for the glass button are carried on a turret past the wire feeding station, and the mechanism for handling the wires must select the proper number of wires, move into position around the molds to deposit the wires in a circle, and then move back and out of the way for the molds to pass on. Means for consistently selecting the proper number of wires from a pack or bundle of the wires, each of which may have weld knots, kinks and other irregularities, must not disturb the orderly arrangement of the wires in the pack.

An object of my invention is improved apparatus for picking short lengths of wires from packs or bundles of the wires and feeding the wires to the desired position on a machine for further handling the wires.

The characteristic features of my invention are defined in the appended claims and one embodiment of my improved wire feeding apparatus is described in the following specification and shown in the accompanying drawings in which—

Figure 1 is a sectioned perspective view of a header with circularly arranged lead-in conductors fed by my improved wire feeding apparatus to the position in which they are sealed;

Figure 2 is a perspective view of part of my improved wire feeding apparatus shown in cooperative relation with a button stem header machine;

Figure 3 is an elevational view of the apparatus of Figure 2 including drive and wire pick-up mechanism;

Figure 4 is a detail of one of the chutes of my improved wire feeding apparatus;

Figures 5 and 6 show, respectively, the funnel carrying jaws in the open and closed positions;

Figure 7 is a sectional view along line 7—7 of Figure 5, but with the jaws in the closed position as in Figure 6;

Figure 8 shows in perspective some of my wire storing magazines in cooperative relation with the wire pick-up jaws;

Figure 9 shows the wire pick-up jaw assembly, and

Figure 10 shows a detail of the pick-up jaw actuating means.

To facilitate the description of my improved wire loading device, it is shown in cooperative relation with one type of machine for making the header shown in Figure 1 where the wires 1 are arranged in a circle and are sealed into a disc of glass 2. The rim of the disc may, if desired, be joined to a metal ring 3. As more fully described in the Franke patent, supra, the metal ring and a ring of glass 4 from which the glass button 2 is finally made, is placed on the lower press mold 5 of the stem machine which is in axial alignment with upper mold 6, and the lead wires are threaded through registering vertical holes in the upper and lower molds. Fires are played upon the glass ring until it softens, when the upper mold moves downwardly pressing the molten mass of glass into a flat disc and hermetically sealing the glass to the wires and to the metal ring. An exhaust tube 7 held in a vertical central bore in the upper mold is lowered at the proper time and its end welded to the center of the glass disc. After the glass has cooled and has been properly annealed the finished header may be removed and a new set of parts, including a metal ring, a glass ring and lead wires, are again placed on the press molds. The molds may conveniently be carried on a turret which revolves, indexing each press mold successively past properly adjusted fires and into registry with my lead wire loading mechanism.

Lead wire hoppers or magazines 8, Figure 3, equal in number to the number of lead wires desired for each header and each carrying a pack of lead wires, are arranged side-by-side with the bottom of the hoppers inclined to the horizontal. The lowermost wire in each hopper is gripped by a two-jaw pincher 9, the several pinchers being mounted in a line on a carriage 10 on two conveyor chains 11 which when driven in a counterclockwise direction over sprocket wheels 12 move the carriage up and over the upper sprocket wheel. The carriage is brought to rest in the position shown in dot-dash lines in Figure 3, the jaws are opened and the wires dropped into the upper ends of the chutes 13. The chutes are supported at their upper ends with their lower ends above the upper ends of the funnels 14, which receive the lead wires as they are dropped. The passage through each funnel is closed by a sliding gate 15 to stop the fall of the lead wires and to hold them in the funnel as the funnels, carried on the two jaws 16 and 17, are moved into position with the lower ends of the funnels just above the openings in the upper press mold. In this position the gate for each funnel is opened and the wires dropped into place in the press molds whereupon the jaws return with the funnels to their loading position, the press mold moves on bringing a new press mold into position and the loading cycle is repeated.

The first and one of the most difficult steps in feeding the lead wires to the stem machine is that of separating a single wire from each of the packs of the wires in the magazines 8. As shown in Figure 8 the bottom of each magazine is V-shaped and in aligned registry with V-shaped notches in shaker bar 18, preferably of flat thin strip metal. The shaker bar 18 is carried at each end on an arm 19 pivoted at 20 with its lower end riding on a vertically movable cam 21, Figure 3, which raises the outer ends of the wires from the bottom of the magazine while the pincher 9 moves under the pack. In this position the pinchers are opened, by mechanism more fully hereinafter described, and the shaker bar 18 lowers the lowermost wire of the pack into the open jaws of the pincher, whereupon the pinchers close and grip the wire. Then bar 18 again raises to place a slight bend in the one wire gripped by the pinchers and to raise the other wires of the pack up and away from the pinchers. The weld knots usually found on the wires are laid in the magazine with the knots outward or to the left of the shaker bar and when the bend is placed in the gripped wire the knot is pulled away from the other wires in the magazine and the gripped wire may be withdrawn without dragging the other wires with it. The gripping faces of the pincher jaws are inclined one with the other in the closed position so that the jaws can grip only one wire at a time. After removal of this one wire the shaker bar is oscillated above pivot 20 as the cam roller passes over the teeth of the cam rack 21 and effectively prevents the wires in each hopper from settling into a hard packed mass. An electromagnet 22 energized by power of commercial frequency vibrates the hopper assembly about its pivot support 23 to shake the lead wires toward the rear walls of the hoppers.

The pincher assembly for carrying the wires from the magazine to the chutes, more fully shown in Figure 9, comprises long parallel bars 24 carried at each end on carriage 10 with rollers 25. The rollers travel in tracks comprising flanges on the machine frame and accurately guide the carriage 10 and the pinchers into the wire pickup position at one end of its travel and into the wire depositing or dropping position at the other end of its travel. Each pair of pinchers comprises jaws 27 pivoted at 28 and normally held closed by a spring 29. Two sliding bars 30 and 31, each with cross pieces between the handles of the pinchers, will when moved in opposite directions open the pinchers against the tension of the springs. The two levers 32 and 33, with rollers 32' and 33' at their ends, are forced apart as the rollers straddle and ride onto pointed cam 34, Figure 10. This movement of the levers forces bar 30 to the right, in Figure 9, and bar 31 to the left. After the lowermost wires in each magazine are lowered into the open pinchers, cam 34 is withdrawn to allow the springs 29 to close the pinchers and grip the wires. In the unloading position of the pinchers where the wires are dropped into the chutes, the rollers ride up onto cam 35 to open the pinchers and release the wires.

To prevent the lead wires from sticking to the pinchers and to insure the dropping of the wires in the upper ends of the chutes 13, a hood 36, more fully shown in Figure 4, is placed over the upper end of each chute. The hood 36 is open on the side from which the wires approach and is provided with two resilient wire hooks 37, the inner ends of which are bent inward and close together to permit the wire to pass between the two hooks but to catch the wire should the wire accidentally stick to and be withdrawn by the pinchers.

From the chutes 13 the wires fall into funnels 14 which, on jaws 16 and 17, carry the wires around the press molds to be loaded, whereupon they are released by gate 15 to drop into holes in the molds. In the machine shown, mechanism is provided for loading eight wires at a time into the stem, four funnels being carried on each of two jaws 16 and 17. As shown in Figures 5, 6 and 7, each jaw is pivoted on pin 40 so that the jaws may swing into position to unload their lead wires and then return to loading position under the chutes and permit the press molds to pass on. Driving mechanism for swinging the jaws and for operating the gates 15 is shown in greater detail in Figures 5, 6 and 7. Jaw actuating slide 41 is linked to each of the jaws through connecting rods 42 and 43, the slide, connecting rods, and jaws being normally held in the retracted position of Figure 5 by coil springs 44 and 45. The slide 41 is forced to the left by cam 46 to close the two jaws around the upper press mold of the header machine, and, while in the closed position, slide 47 is moved to the left by roller 48 riding on cam 49 to bring the openings in the gate members 15 into registry with the passages through the funnels 14 and permit wires 1 to drop. Each of the gates is normally retracted to close the funnel passages by compression springs 50 and 51 and can be moved to open the passages only when the jaws are closed and when the slide 47 through its cross-head 52 is pushed to the left against the biasing force of its spring 53. The opposite ends of cross-head 52 engage blocks screwed to the ends of gates 15.

Driving means for coordinating the movement of the wire pickup mechanism, conveyor, jaws and gates, best shown in Figure 3, comprises a main slide 54 which preferably is connected to the stem making machine so that it travels upward and downward to complete one lead wire loading cycle each time a press mold is indexed into the loading position. Main slide 54 carries cams 46 and 49 for actuating jaws 16 and 17 and the gate 15 as well as the cam 21 for moving the lead wires, through linkage 19 and bar 18, in synchronism with the pinchers 9. In addition, main slide 54 carries rack 55 meshed with the first gear 56 of a gear train coupled to the lower sprocket wheel of the pincher-carriage-conveyor assembly.

Cam 34 opens the pincher jaws as the pinchers move in to receive the lead wires and, as explained above, the cam 34 is retracted to close the pinchers on the lead wires while the pinchers are at rest. Cam 34 is moved by fork rod 34', the long vertical shaft of which slidably passes through lugs 57 on the frame of the machine. Lug 58 travels between two ears on rod 34' and operates the cam 34 in alternate directions when the main slide is, respectively, at rest in the upper and lower positions. A stiff friction spring 59 holds the rod 34' stationary except when positively moved by pin 58.

My improved wire feeding apparatus is well adapted for feeding wires to stem making machines in which press molds or other structures, mounted above the position to which the wires are fed, rotate with the stem machine and thus require that all parts of the wire feeding mechanism be well outside the circle inscribed by the super-structure of the machine. From the wire hoppers the wires are carried on the conveyor radially toward the center of the stem machine and the wires are dropped in the chutes which guide the wires into the funnels 14, and none of the wire handling mechanism overlies the line of travel of the press molds. The composite welded lead wires with weld knots near one end may be laid in the hoppers with the knots beyond the open ends of the hoppers so that each wire when gripped may be slightly bent and easily withdrawn. Then, when the wire is up-ended and dropped the knotted end of the wire enters the press mold and is sealed in glass.

My improved wire feeding apparatus picks short lengths of wires from packs or bundles of the wires and feeds the wires to the desired position on the machine for further handling the wires. My improved wire feeding machine is positive in action, simple to adjust and easy to operate.

I claim:

1. In a wire-feeder, the combination of a hopper with a V-shaped bottom open at one end and inclined to the horizontal plane, a conveyor, a pincher with two jaws for positively gripping the lowermost wire in the bottom of said hopper, said pincher being mounted on said conveyor for withdrawing and up-ending said wire, means for opening the jaws to release the wire in its up-ended position, a funnel, a chute positioned to receive the released wire and guide it into said funnel, a gate in the funnel above the lower end of said funnel for stopping said wire in said funnel, means for moving said funnel over the unloading position of the wire, and means for opening said gate.

2. In a wire-feeder, the combination of an inclined conveyor chain over two sprocket wheels, a wire carrying pincher on said chain, a hopper with a V-shaped bottom open at one end and inclined to the horizontal plane adjacent the lower sprocket wheel, a chute opposite the upper sprocket wheel, means for positively gripping the lowermost wire in the bottom of said hopper and carrying said wire in an up-ended position over the upper sprocket wheel and above said chute, a funnel below said chute to receive said wire, a gate in said funnel for stopping said wire in said funnel, means for moving said funnel from below the chute to the unloading position of the wire, and means for opening said gate.

3. In a wire-feeder, the combination of an inclined hopper open at one end with a V-shaped bottom, an inclined conveyor, a pair of pinchers carried on said conveyor, and being movable in alignment with the bottom of said hopper to a position at the upper end of the conveyor where the pinchers ride over a conveyor wheel to deliver said wire up-ended to wire dropping position, a chute supported beneath said pincher in the wire dropping position, a funnel below the lower end of said chute, a gate in said funnel, and means for bodily moving said funnel.

4. In a wire-feeder, a hopper for a pack of side-by-side wires, said hopper being open at one end, shorter in length than the wires, V-shaped in cross section and tilted to incline the wires, a wire gripping pincher, a conveyor carrying the jaws of the pincher, the conveyor being constructed and arranged to move the pincher in a straight path in axial alignment with the bottom wire of the hopper to and from the wire pick-up position and to move the pinchers in a curved path into the wire dropping position, a funnel below the wire dropping position of the pinchers and movable to the wire unloading position.

5. In a wire-feeder, the combination of a hopper with a V-shaped inclined bottom open at one end, wire clamping jaws movable in a line co-extensive with the bottom line of said hopper, means for opening and closing said jaws, means for lowering the projecting ends of the wires in the hopper into the open jaws, means for raising the pack of wires after the jaws have closed on one of the wires to slightly bend the gripped wire away from said pack and means for withdrawing the gripped wire lengthwise from the pack.

6. In combination a hopper for a pack of wires, the bottom of said hopper being V-shaped, inclined to the horizontal and open at one end, a thin flat bar across the open end of the hopper with a V-shaped notch in registry with the V-shaped open end of the hopper, wire gripping jaws movable in alignment with the V-bottom of the hopper and normal to the plane of the bar, said bar being movable in its plane, and means for synchronizing the movement of said bar and said wire gripping jaws.

7. In combination a hopper for a pack of wires, the bottom of said hopper being V-shaped, inclined to the horizontal and open at one end, a bar across the open end of the hopper with a V-shaped notch in registry with the open end of the hopper, wire gripping jaws movable in alignment with the bottom of the hopper, and means for moving said bar upward across the end of the hopper, and means for vibrating said hopper to shake wires in the hopper toward its lower closed end.

8. In a wire-feeder, the combination of a plurality of side-by-side hoppers, each with a V-shaped bottom inclined to the horizontal, a plurality of side-by-side two-jaw pinchers with parallel pivots, each of the pairs of jaws being in alignment with the bottom of one of the hoppers, two sliding bars below and parallel to the line of pincher pivots, each bar engaging one of the jaws of each pincher, means for moving said bars in opposite directions to operate the jaws of the pinchers.

9. In a wire-feeder, the combination of a plurality of aligned wire chutes, a plurality of funnels, a carrier for said funnels for supporting each funnel in loading position under one of said chutes and means for moving said carrier and funnels to a wire unloading position, and a gate in each funnel operable to open passage through the funnel in the unloading position.

10. In a wire-feeder, the combination of two semi-cylindrical funnel carrying jaws, a carrying pivot for each jaw outside the circle of the jaws, and means for swinging the ends of the jaws together to complete a cylinder, a plurality of funnels on each jaw, and a gate in each jaw for closing the passage through each funnel.

11. In a wire-feeder, the combination of a hopper with a V-shaped bottom for a pack of short lengths of wires, wire gripping jaws movable in alignment with the apex of said bottom, the jaws of said pinchers being inclined one with the other when closed upon one of said wires.

12. In a wire-feeder, a wire receiving hood comprising an upstanding tubular member open on one side and into which an upstanding wire may be passed, and means to prevent withdrawal of the wire through said side of the hood comprising a wire extending from near the edge of said open side toward the center of the hood.

WILLIAM T. ENGEL.